(12) United States Patent
Boulton

(10) Patent No.: US 11,656,861 B2
(45) Date of Patent: May 23, 2023

(54) SELECTIVELY INSTALLING APPLICATIONS BASED ON MANIFEST FILES

(71) Applicant: BlackBerry Limited, Waterloo (CA)

(72) Inventor: Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/904,654

(22) Filed: Jun. 18, 2020

(65) Prior Publication Data

US 2020/0401389 A1    Dec. 24, 2020

Related U.S. Application Data

(60) Provisional application No. 62/864,123, filed on Jun. 20, 2019.

(51) Int. Cl.
  *G06F 8/61*    (2018.01)
  *G06F 8/65*    (2018.01)
  (Continued)

(52) U.S. Cl.
  CPC ............... *G06F 8/61* (2013.01); *G06F 8/65* (2013.01); *G06F 21/51* (2013.01); *G06F 21/6218* (2013.01); *H04L 67/34* (2013.01)

(58) Field of Classification Search
  CPC ... G06F 8/65; G06F 8/61; G06F 21/51; G06F 21/6218; H04L 67/34
  See application file for complete search history.

(56) References Cited

U.S. PATENT DOCUMENTS 8,255,991 B1 *  8/2012  Hackborn ............... H04L 67/06
                                                    726/21
8,935,755 B1 *  1/2015  Kay ............................ G06F 8/61
                                                    726/4

(Continued)

FOREIGN PATENT DOCUMENTS

EP        2533150      12/2012
EP        2533168      12/2012

OTHER PUBLICATIONS

EPO, Extended European Search Report relating to application No. 20178583.9 dated Nov. 20, 2020.
EP Office Action, Application No. 20178583.9 dated Jul. 6, 2022.

*Primary Examiner* — S. Sough
*Assistant Examiner* — Cheneca Smith
(74) *Attorney, Agent, or Firm* — Rowand LLP

(57) ABSTRACT

A computer-implemented method of selectively installing an application from an application archive file is disclosed. The method includes receiving an indication to install an application on a computing device, the application being available for download as an archive file storing a manifest file and one or more installation files. The method further includes determining that installation of the application is permissible. The determining includes: without downloading the archive file, downloading at least a portion of the manifest file; and determining, based on the at least a portion of the manifest file, that installation of the application on the computing device would comply with a device management policy for the computing device. After determining that installation of the application is permissible, the archive file is downloaded and the application is installed therefrom. Related computer-readable media and computer systems are also disclosed.

20 Claims, 6 Drawing Sheets

(51) Int. Cl.
*G06F 21/51* (2013.01)
*G06F 21/62* (2013.01)
*H04L 67/00* (2022.01)

(56) References Cited

U.S. PATENT DOCUMENTS

| | | | |
|---|---|---|---|
| 8,935,775 B2 | 1/2015 | Fryman et al. | |
| 2006/0117305 A1* | 6/2006 | Tarkkala | G06F 9/45508 717/139 |
| 2012/0317565 A1* | 12/2012 | Carrara | H04L 63/10 717/178 |
| 2012/0317638 A1* | 12/2012 | Carrara | G06F 21/44 726/17 |
| 2013/0067448 A1 | 3/2013 | Venkateshwara et al. | |
| 2013/0219383 A1* | 8/2013 | Hilerio | G06F 8/65 717/178 |
| 2015/0143451 A1* | 5/2015 | Solow | H04L 67/12 726/1 |
| 2019/0065517 A1 | 2/2019 | Comertoglu et al. | |

* cited by examiner

```
<?xml version="1.0" encoding="utf-8"?>
<manifest xmlns:android="http://schemas.android.com/apk/res/android"
    package="com.example.myexampleapp"
    ... >

...

<uses-permission android:name="android.permission.SEND_SMS"/>

<uses-feature android:name="android.hardware.sensor.compass"
        android:required="true" />

<resource android:name="https://example.com/image1.png" />

<resource android:name="https://example.com/image2.png" />

...

<dir android:name="/stuff" perms="rw" />

</manifest>
```

FIG. 6

SELECTIVELY INSTALLING APPLICATIONS BASED ON MANIFEST FILES

CROSS-REFERENCE TO RELATED APPLICATIONS

The present application claims priority to U.S. provisional patent application Ser. No. 62/864,123 filed Jun. 20, 2019, the contents of which are hereby incorporated by reference.

TECHNICAL FIELD

The present disclosure relates to installation of software packages and, more particularly, to the use of a manifest file separate from an application installation archive file in determining whether a software application should be installed.

BACKGROUND

Software packages may be installed on computing devices such as, for example, to provide new or updated functionality. Software applications may be provided for installation as an archive file that includes files needed to install and run that application. Such archive files may, for example, be downloaded from an online application distribution service (an application store).

Some computing devices may be under the control of a central administrator. For example, mobile devices owned by an organization such as, for example, an enterprise and/or individually-owned devices being used with such an organization (e.g., devices participating in a bring-your-own-device (BYOD) program) such as may be subject to such administrative controls. Device management software may allow policies—device management policies—to be imposed controlling one or more aspects of such devices. For example, device management policies may set requirements relating the use of a personal identification number (PIN) to lock a device and/or complexity requirements for passwords and/or PINs related to the device.

BRIEF DESCRIPTION OF THE DRAWINGS

Reference will now be made, by way of example, to the accompanying drawings which show example embodiments of the present application and in which:

FIG. 6 show portions of another example manifest file; and

Like reference numerals are used in the drawings to denote like elements and features.

DETAILED DESCRIPTION OF EXAMPLE EMBODIMENTS

Figure 1:
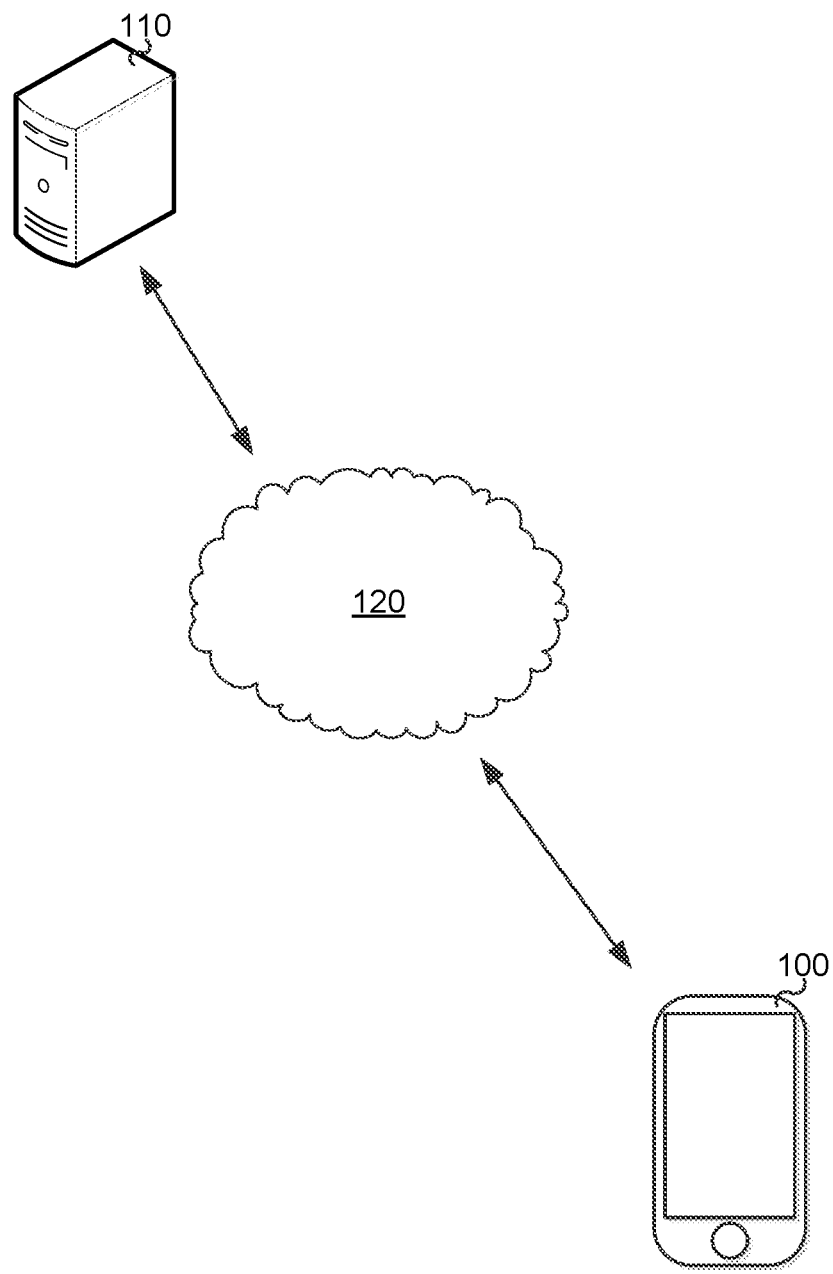
FIG. 1 illustrates an operating environment of an example implementation of the subject matter of the present application.
Figure 2:
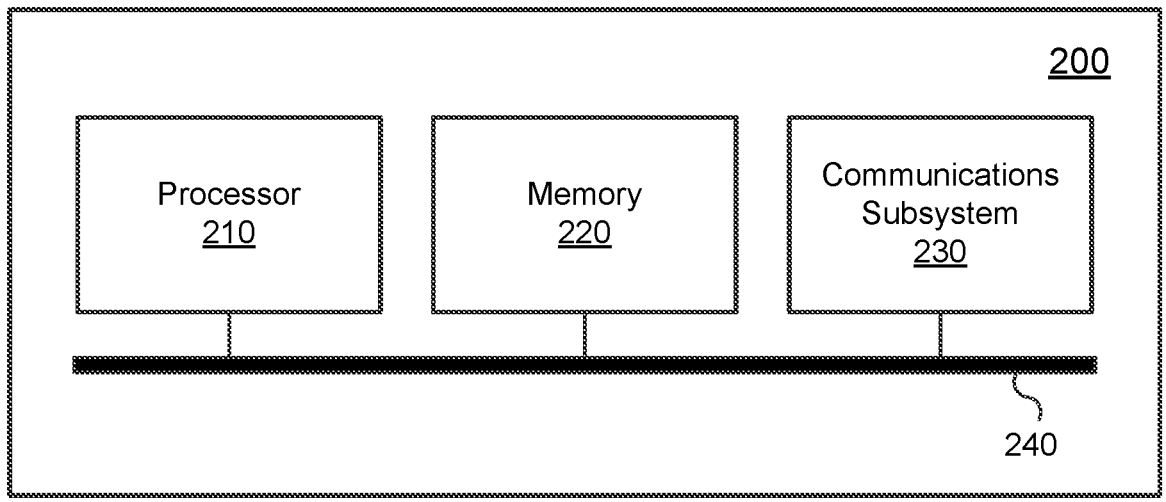
FIG. 2 shows a high-level block diagram of an example computing device.

According to the subject matter of the present application, there may be provided a computer-implemented method. The method may include receiving an indication to install an application on a computing device. The application may be available for download as an archive file storing a manifest file and one or more installation files. It may be determined that installation of the application is permissible. The determining may include without downloading the archive file, downloading at least a portion of the manifest file. The determining may further include determining, based on the at least a portion of the manifest file, that installation of the application on the computing device would comply with a device management policy for the computing device. The method may further include, after determining that installation of the application is permissible, downloading the archive file and installing the application from the archive file.

Conveniently, in this way, an application may be installed only if a corresponding manifest is in accord with a device management policy but without having to download an application installation package to allow the manifest file to be extracted therefrom so that it can be compared to the manifest policy. Notably, having to download an application installation package to obtain a manifest file to compare against a device management policy may entail a greater delay (e.g., in waiting for the download to complete) before checks against the device management policy can be performed as compared to if performing the check only requires downloading the manifest file or even a portion thereof. Furthermore, the downloading of an entire application installation archive file to obtain a manifest may imply unnecessary data transfer in circumstances where it is determined that the device management policy precludes installation of the application, thus meaning the rest of the contents of the archive file will go unused.

In some implementations, the computer-implemented method may further include receiving an indication to install a second application on the computing device, the second application available for download as a second archive file storing a second manifest file and one or more installation files; and determining that installation of the second application is not permissible. The determining may include, without downloading the second archive file, downloading at least a portion of the second manifest file, and, determining, based on the at least a portion of the second manifest file, that installation of the second application on the computing device would not comply with a device management policy for the computing device.

In some implementations, determining, based on the at least a portion of the manifest file, that installation of the application on the computing device would comply with a device management policy for the computing device may include extracting, from the at least a portion of the manifest file, a list of one or more device permissions requested by the application, and comparing the list of one or more device permissions requested by the application to a list of one or more device permissions associated with the device management policy for the computing device.

In some implementations, determining, based on the at least a portion of the manifest file, that installation of the application on the computing device would comply with a device management policy for the computing device may include extracting, from the at least a portion of the manifest file, an address of a resource utilized by the application that is not included in the archive file; and determining, using the address, that the resource is accessible by the computing device. For example, it may be that determining, using the address, that the resource is accessible by the computing device includes attempting to download the resource from the address.

In some implementations, the method may further include extracting, from the at least a portion of the manifest file, two or more addresses of resources utilized by the application that are not included in the archive file, and downloading resources from at least two of the two or more addresses in parallel.

In some implementations, determining, based on the at least a portion of the manifest file, that installation of the application on the computing device would comply with a device management policy for the computing device may include extracting, from the at least a portion of the manifest file, file permissions to be associated with one or more folders associated with the application after installation, and determining that the file permissions do not violate one or more file permission rules associated with the device management policy for the computing device. For example, it may that the one or more file permission rules include a restriction against applications having associated files that are globally readable. Additionally or alternatively, it may be that the one or more file permission rules include a restriction against applications having associated files that are globally writeable.

In some implementations, the at least a portion of the manifest file is downloaded from a different server than the archive file.

According to the subject matter of the present application, there may be provided one or more computer-readable storage media storing instructions that, when executed by one or more processors of a computing device, cause the computing device to: In some implementations, the computer-readable storage media may be non-transitory computer-readable storage media. The instructions, when executed by one or more processors of a computing device, may cause the computing device to receive an indication to install an application on a computing device, the application available for download as an archive file storing a manifest file and one or more installation files; and determine that installation of the application is permissible. It may be that a determination that installation of the application is permissible is based on: a download of at least a portion of the manifest file without a download of the archive file, and a determination, based on the at least a portion of the manifest file, that installation of the application on the computing device would comply with a device management policy for the computing device. The instructions, when executed by the one or more processors of the computing further device, may further cause the computing device to, after the determination that installation of the application is permissible, download the archive file and install the application from the archive file.

In some implementations, determination, based on the at least a portion of the manifest file, that installation of the application on the computing device would comply with a device management policy for the computing device may be based on: extraction, from the at least a portion of the manifest file, of a list of one or more device permissions requested by the application; and a comparison of the list of one or more device permissions requested by the application to a list of one or more device permissions associated with the device management policy for the computing device.

In some implementations, determination, based on the at least a portion of the manifest file, that installation of the application on the computing device would comply with a device management policy for the computing device may be based on: extraction, from the at least a portion of the manifest file, an address of a resource utilized by the application that is not included in the archive file; and a determination, using the address, that the resource is accessible by the computing device.

In some implementations, the determination, using the address, that the resource is accessible by the computing device may be based on an attempt to download the resource from the address.

In some implementations, the instructions, when executed by the one or more processors of the computing further device, may further cause the computing device to: extract, from the at least a portion of the manifest file, two or more addresses of resources utilized by the application that are not included in the archive file; and download resources from at least two of the two or more addresses in parallel.

In some implementations, the determination, based on the at least a portion of the manifest file, that installation of the application on the computing device would comply with a device management policy for the computing device may be based on: extraction, from the at least a portion of the manifest file, of file permissions to be associated with one or more folders associated with the application after installation; and a determination that the file permissions do not violate one or more file permission rules associated with the device management policy for the computing device.

In some implementations, the one or more file permission rules may include a restriction against applications having associated files that are globally readable.

In some implementations, the one or more file permission rules may include a restriction against applications having associated files that are globally writeable.

In some implementations, the at least a portion of the manifest file may be downloaded from a different server than the archive file.

According to the subject matter of the present application, there may be provided a computer system. The computer system may include one or more processors and one or more computer-readable media. The one or more computer-readable media may store instructions, that when executed by one or more processors of a computing device, cause the computer system to: receive an indication to install an application on a computing device, the application available for download as an archive file storing a manifest file and one or more installation files; and determine that installation of the application is permissible. A determination that installation of the application is permissible may include, a download of at least a portion of the manifest file without a download of the archive file, and a determination, based on the at least a portion of the manifest file, that installation of the application on the computing device would comply with a device management policy for the computing device. The one or more computer-readable media may further store instructions, that when executed by one or more processors of a computing device, cause the computer system to, after the determination that installation of the application is permissible, download the archive file and install the application from the archive file.

Other example embodiments of the present disclosure will be apparent to those of ordinary skill in the art from a review of the following detailed description in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 illustrates a simplified schematic operation diagram illustrating an arrangement of computing devices in the operating environment of an example implementation of the subject matter of the present application.

As illustrated, a mobile computer system 100 and a server computer system 110 are in communication via a network 120.

Each of the mobile computer system 100 and the server computer system 110 may be in geographically disparate locations. Put differently, the mobile computer system 100 may be remote to others of the server computer system 110.

The mobile computer system 100 is or includes one or more computing devices. The mobile computer system 100 may, as illustrated, be a smartphone. Alternatively, the mobile computer system 100 may be or may include a device of another type such as, for example, a personal computer, a laptop computer, a tablet computer, a notebook computer, a hand-held computer, a personal digital assistant, a wearable computing device (e.g., a smart watch, a wearable activity monitor, wearable smart jewelry, and glasses and other optical devices that include optical head-mounted displays), or any other type of computing device that may be configured to store data and software instructions, and execute software instructions to perform operations consistent with disclosed embodiments. For example, it may be that the mobile computer system 100 is or is a component of an IoT (Internet of Things) device such, for example, a vehicle, an appliance such as, for example, a washing machine or a refrigerator, a smart device, a connected device, a building such as, for example, a home, an Enterprise of Things (EoT) devices (i.e., an IoT device in an enterprise) or a node or combination thereof. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising.

The server computer system 110 is or includes one or more computing devices. As further described below, the server computer system 110 correspond to an application store ("app store") adapted to provide applications for installation on computing devices such as, for example, the mobile computer system 100. As mentioned above, the server computer system 110 may include one or more computing devices. For example, the server computer system 110 may include multiple computing devices such as, for example, database servers, compute servers, and the like. The multiple computing devices may be in communication using a computer network. For example, computing devices may communicate using a local-area network (LAN). The server computer system 110 may include multiple computing devices organized in a tiered arrangement. For example, the server computer system 110 may include middle-tier and back-end computing devices. The server computer system 110 may be a cluster formed of a plurality of interoperating computing devices.

As further described below, the mobile computer system 100 communicates with the server computer system 110 to selectively install an application package available for download by way of the server computer system 110.

As noted above, each of the mobile computer system 100 and the server computer system 110 is or may include a computing device. Example computing device 200 may be an example of one or both of the mobile computer system 100 and the server computer system 110 and/or may correspond to one or more components of either or both of the mobile computer system 100 and the server computer system 110. As will be discussed in greater detail below, each of the mobile computer system 100 and the server computer system 110 includes software that adapts it to perform one ore more particular functions. Notably, as further described below applications may be selectively installed on the mobile computer system 100 and those applications, when installed, may adapt the mobile computer system 100 to perform one or more additional or unique functions.

The example computing device 200 includes a variety of modules. For example, as illustrated, the example computing device 200 may include a processor 210, a memory 220, and a communications subsystem 230. As illustrated, the foregoing example modules of the example computing device 200 are in communication over a bus 240.

The processor 210 is or includes a hardware processor and may, for example, be or include one or more processors using ARM, x86, MIPS, or PowerPC™ instruction sets. For example, the processor 210 may be or include Intel™ Core™ processors, Qualcomm™ Snapdragon™ processors, or the like.

The memory 220 may include random access memory, read-only memory, persistent storage such as, for example, flash memory, a solid-state drive or the like. Read-only memory and persistent storage are a computer-readable medium. A computer-readable medium may be organized using a file system such as may be administered by an operating system governing overall operation of the example computing device 200.

The communications subsystem 230 allows the example computing device 200 to communicate with other computing devices and/or various communications networks. For example, the communications subsystem 230 may allow the example computing device 200 to communicate with and/or via the network 120. The communications subsystem 230 may allow the example computing device 200 to send or receive communications signals. Communications signals may be sent or received according to one or more protocols or according to one or more standards. For example, the communications subsystem 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications subsystem 230 may allow the example computing device 200 to communicate via Wi-Fi™, using Bluetooth™ or via some combination of one or more networks or protocols. All or a portion of the communications subsystem 230 may be integrated into a component of the example computing device 200. For example, the communications subsystem may be integrated into a communications chipset.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
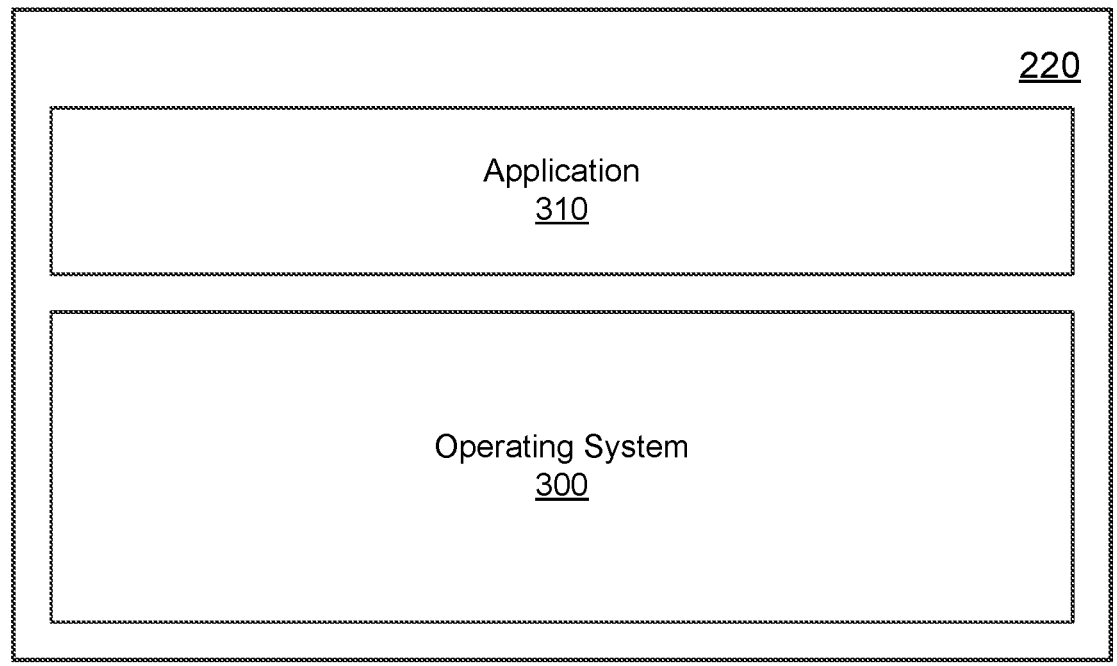
FIG. 3 shows a simplified organization of software components stored in a memory of the example computing device of FIG. 2.

FIG. 3 depicts a simplified organization of software components stored in the memory 220 of the example computing device 200. As illustrated these software components include an operating system 300 and an application 310.

The operating system 300 comprises software and may comprise, for example, software such as, for example, Android™, QNX™, Linux™, Apple™ iOS™, Microsoft™ Windows™, or the like. The operating system 300 controls the overall operation of the example computing device 200 and allows the application 310 to access the processor 210, the memory 220, and the communications subsystem 230.

The application 310, comprises software that, in combination with the operating system 300, adapts the example computing device 200 to operate as a device for various purposes. For example, the application 310 may cooperate with the operating system 300 to adapt a suitable instance of the example computing device 200 to operate as the mobile computer system 100 and/or the server computer system 110.

As mentioned above, according to the subject matter of the present application, one or more software applications may be selectively installed on the mobile computer system 100 based on, for example, whether installation of a particular application would comply with a device management policy (e.g., a mobile device management policy) governing one or more aspects of the mobile computer system 100.

The operation of the mobile computer system 100 in determining whether to install a particular software application will now be discussed with reference to FIG. 4.

Figure 4:
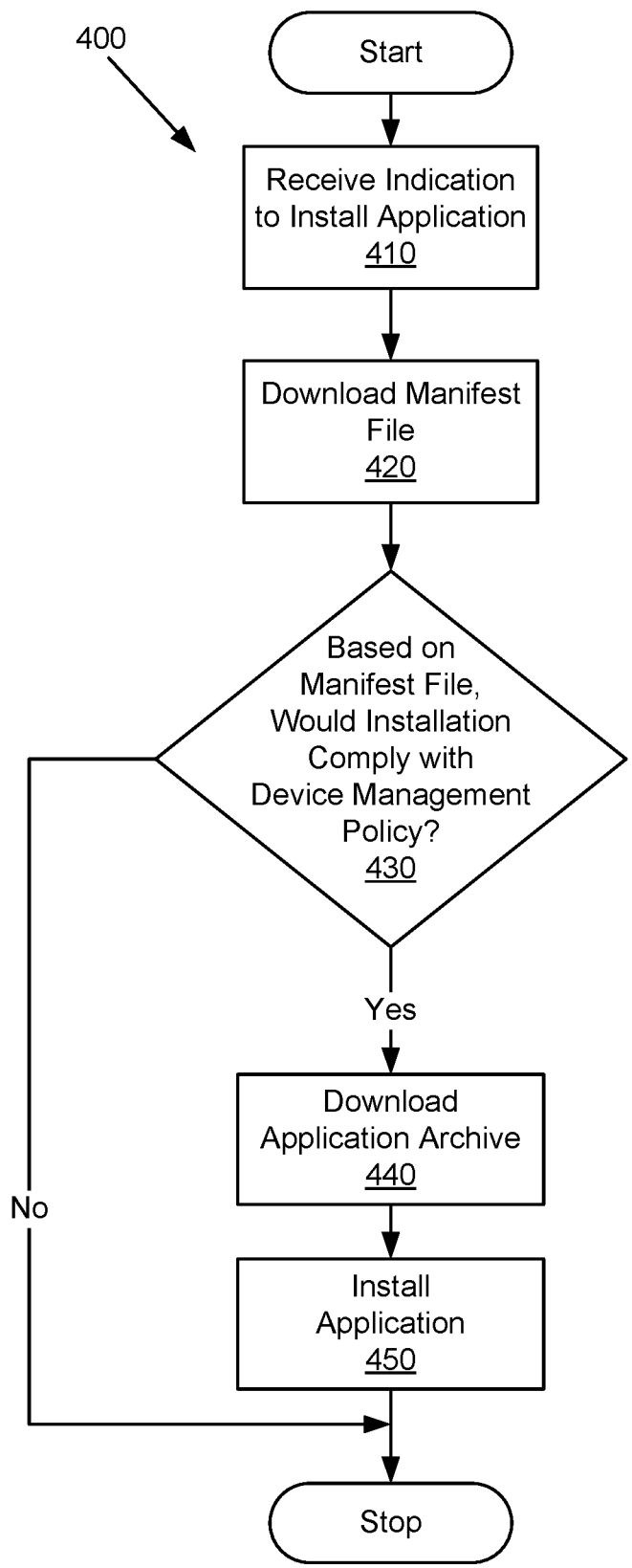
FIG. 4 provides a flowchart illustrating a method for selectively installing an application based on a manifest file.

FIG. 4 provides a flowchart illustrating operations in an example method, a method 400, for selectively installing a software application. The method 400 starts with an operation 410. As further described below, according to the method 400, the mobile computer system 100 determines whether or not to install the particular software application based on a manifest file which is obtained separate from the application archive that would be utilized in installing the application. Operations, starting with an operation 410, are performed by one or more processors of a computing device of the mobile computer system 100 such as, for example, the processor 210 of a suitably configured instance of the example computing device 200, executing software such as, for example, a suitable instance of the operating system 300 and/or the application 310.

At the operation 410, an indication is received to install a software application on the mobile computer system 100.

The indication may correspond to user-input. For example, the indication may correspond to user-input received at the mobile computer system 100.

The software application is an application available for download from a remote server. For example, the software application may be available for download from an app store. In a particular example, the software application may be available for download from the server computer system 110.

The software application may be available for download in the form of an application installation archive file. An archive file is a file including metadata and one or more files. For example, the metadata may provide a directory or folder structure for the one or more files included in the archive file. Such an archive may include one or more files required for installing the software application—i.e., one or more installation files—and a manifest file.

An example of software archives including one or more files required for installing a given software application and a corresponding manifest file is found in the Android™ Package format (APK) used by the Android operating system for distribution and installation of software applications ("mobile apps"). APK files are a type of archive file based on the ZIP archive format. APK files may include code, resources, and the like required by a program as well as an application manifest file. Installation of applications on an Android device typically involves downloading (potentially via an app store such as, for example, the Google Play Store) a corresponding APK file and installing that APK file on that device.

Notably, in some cases, APK files may be generated based on other files or input such as, for example, Android App Bundles. For example, an APK may be generated based on an Android App Bundle if the Google Play Dynamic Delivery app serving model is employed. Android App Bundles are explained in "About Android App Bundles", available from https://developer.android.com/guide/app-bundle/ (retrieved on Jun. 19, 2019), the contents of which are herein incorporated by reference in their entirety. The present application is equally applicable to APK files generated based on Android App Bundles and APK files built or generated in other manners such as, for example, using Android Studio.

More broadly, it is noted that references to APK files, Android App Bundles, and aspects thereof (including, for example, manifest file formats) are provided herein by way of example. It is noted that the subject matter of the present application may be equally applicable to other types and formats of software archives and/or manifest files including potentially those such as may be utilized with operating systems/platforms other than Android.

As mentioned above, software archives such as, for example, APK files, may include some form of a manifest file. A manifest file provides metadata related to a set of files. In particular, a manifest file provided in an application package may provide metadata related to the installation of the corresponding application such as, for example, list of installation files, permissions or configuration settings. A manifest file may follow a structured format. For example, a manifest file may follow a particular XML format.

Figure 5:
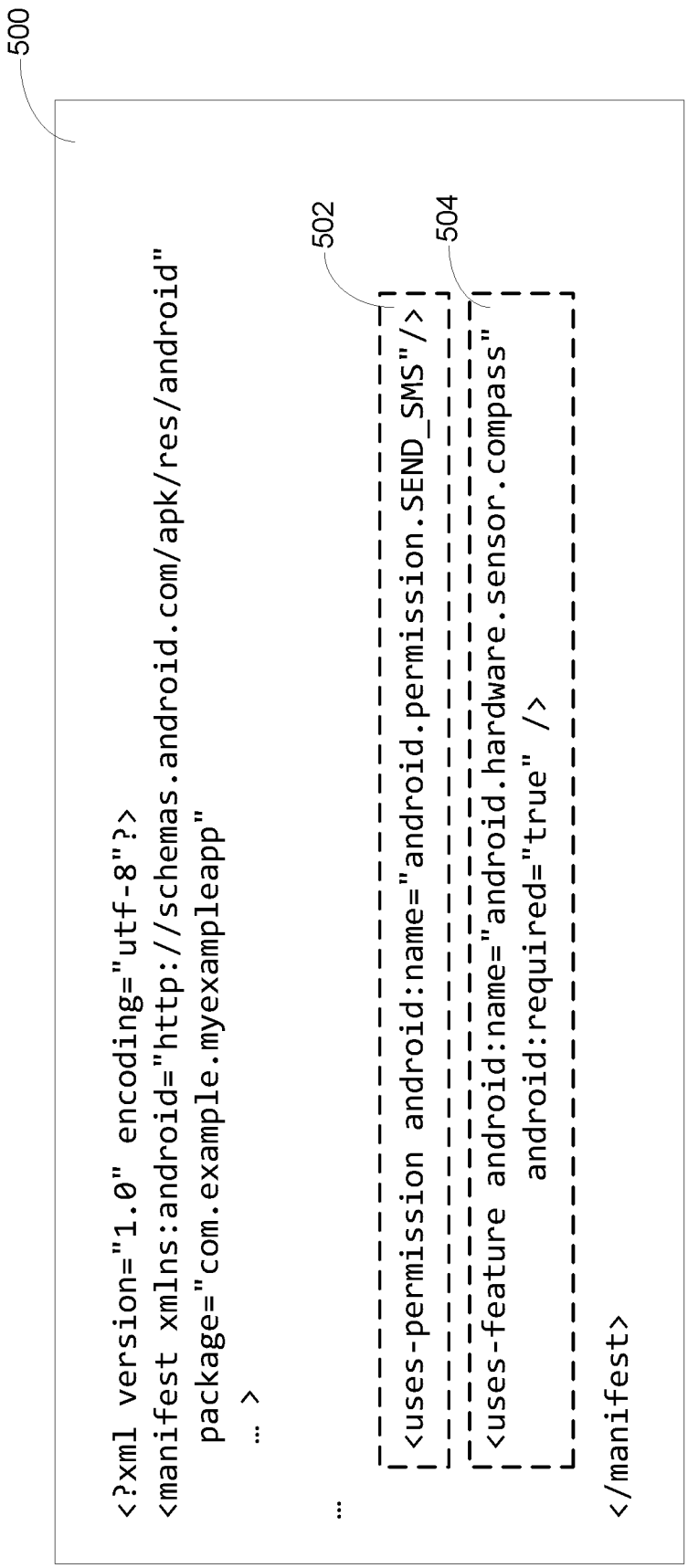
FIG. 5 shows portions of an example manifest file.

An excerpt 500 providing portions of an example of a manifest file such as may be included in an APK file is provided in FIG. 5. As illustrated, the manifest file depicted in the excerpt 500 is structured as XML. Such Android manifest files may include various metadata such as, for example, an indication of items including, for example, one or more permissions required by the corresponding application. For example, the manifest file shown in the excerpt 500 includes a portion 502 indicating that the application corresponding to that manifest file requires access to send SMS messages.

Android manifest files may also, additionally or alternatively, include an indication of Android features desired or required by the corresponding application. For example, the manifest file shown in the excerpt 500 includes a portion 502 indicating that the application corresponding to that manifest file requires access to use the compass sensor of a device on which it is installed.

As mentioned above, on operating systems such as, for example, Android, applications are installed from application archives such as, for example, APK files, and these application archives may include manifest files. Application installation based on an application archive typically begins by having the target computing device download or otherwise retrieve the application archive and then, after the application archive is fully downloaded, the application can be installed. For example, such installation may be guided by the manifest file which can be extracted from the downloaded application archive once it is downloaded.

Notably, it is possible that it could be determined, after an application archive is downloaded, that the corresponding application should not or cannot be installed on the computer system.

For example, it could be that a user is unwilling to grant the application one or more required permissions, those required permissions being determined based on entries in the manifest file—e.g., as discussed above with respect to the portion 502 (FIG. 5) of the excerpt 500.

In another example, it could be that, in installing an application from a downloaded application file, it may be determined that installation of that application would be contrary to a device management policy for the target computer system. In a particular example, where the target computer system is a mobile computing device such as, for example, the mobile computer system 100, it could be determined that installation of the application is prohibited by a mobile device management policy in effect on that mobile device. For example, it could be that the mobile device management policy prohibits the installation of applications requiring particular permissions and/or requiring use of certain device features.

Notably, while determination as to whether installation of a given application package would or would not comply with a device management policy for the target computer system is made based on the application package, it may, more particularly, be made based on the manifest file provided in the application package. According to the subject matter of the present application, the manifest file, or at least a portion thereof, is first downloaded on its own (without downloading the application package as a whole). Conveniently, in this way, a determination can be made as to whether installation of that application is permissible according to the device management policy before the application package is downloaded. Indeed, where it is determined that installation of the application on the computer system would not comply with a device management policy for that device, downloading of the application package could be foregone or avoided.

Returning to consideration of FIG. 4, following receipt of the indication to install an application on the mobile computer system 100 at the operation 410, an operation 420 is next.

At the operation 420, the manifest file, or at least a portion of the manifest file, is downloaded without downloading the archive file. In some cases, the manifest file may be downloaded from the server computer system 110. In other cases, the manifest file may be downloaded from some other remote computing device (e.g., a different server than that from which the application installation archive file would be downloaded). For example, it could be that the manifest file is downloaded from a server provided by or associated with a device management software provider and/or a device vendor and/or an operating system vendor.

Following the operation 420, at the operation 430 it is determined whether, based on the manifest file or a portion thereof (as the case may be), installation of the application would comply with a device management policy for the mobile computer system 100.

Examples of determining, based on at least a portion of a manifest file, that the installation of an application on a computing device would comply with a device management policy for that computing device will now be discussed.

In a first example, determining, based on at least a portion of a manifest file, that installation of an application on the device would comply with such a device management policy may include, extracting, from the at least a portion of the manifest file, a list of one or more device permissions requested by the application. For example, this could correspond to extracting one or more portions of a manifest file like or akin to the portion 502 (FIG. 5) of the manifest file shown in the excerpt 500. Then, the extracted list of one or more device permissions requested by the application may be compared to a list of one or more device permissions associated with the device management policy. For example, the device management policy may include a block or black list of permissions considered impermissible under the policy. In a particular example, it may be that a device management policy prohibits applications requiring permission to access a device's location. Additionally, or alternatively, the device management policy may include a list of particular combinations of permissions that, according to the policy, may not be permissible to grant to a single application. For example, it may be that applications are prohibited from having access to both a device's location and the ability to send data via a network, while either of those permissions alone could potentially be permissible for a given application to have/require.

In a second example, it may be that determining, based on at least a portion of a manifest file, that installation of an application on the device would comply with such a device management policy includes consideration of particular features required by the application. For example, it may be that a list of one or more device features requested by the application are extracted from the at least a portion of the manifest file and then compared to a list of features associated with the device policy. The list of one or more permissions from the manifest file might correspond to extracting one or more portions of a manifest file like or akin to the portion 504 (FIG. 5) of the manifest file shown in the excerpt 500. The list of features associated with the device policy may take a variety of forms. For example, the list of features associated with the device policy might, for example, be a white list of permissible features, a black list of impermissible features, or a combination thereof.

In a third example, it may be that the first and second examples are combined and that determining that installation of the application on the computing device would comply with a device management policy for the computing device involves consideration, based on at least a portion of a manifest file for the application, of both permission(s) and feature(s) required by the application.

In any event, if it is determined, based on the manifest file or a portion thereof (as the case may be), that installation of the intended application on the mobile computer system 100 would comply with the device management policy for that computing device, then an operation 440 is next. By way of overview, at the operation 440, the application archive will be downloaded.

Alternatively, if it is determined, based on the manifest file or the portion thereof (as the case may be), that installation of the intended application on the mobile computer system 100 would not comply with the device management policy for that computing device, then the method 400 terminates. Notably, this may imply that, where installation of the software application is blocked by the mobile device management policy, the downloading of the application archive unnecessarily may be avoided.

Returning to the discussion of the case where it was determined at the operation 430 that installation of the application would comply with device management policy and the operation 440 follows, as mentioned above, at the operation 440, the archive file for installing the application is downloaded. Then, an operation 450 is next.

At the operation 450, the application is installed based on (e.g., using) the archive file downloaded at the operation 440.

Notably, where a manifest file is downloaded in advance of the downloading of the application archive file (if the application archive file is downloaded at all), if additional metadata is included in the manifest file, then additional pre-installation checks—e.g., checks relative to a device management policy—may be performed. Additionally or alternatively, including additional metadata in the manifest file may allow potential efficiencies to be obtained in relation to the installation process. Possible additional checks and potential efficiencies will now be discussed with regard to FIG. 6.

FIG. 6 provides an excerpt 600 of an example manifest file akin to the Android manifest file depicted in FIG. 5, but with additional metadata such as may allow further functionality to be provided as compared to a manifest file omitting such metadata.

As illustrated, the manifest file depicted in the excerpt 600 has been augmented with additional metadata. Examples of this additional metadata are found in the portion 602 and the portion 604.

The portion 602 includes information related to the permissions ("perms=") for a directory named "/stuff" related to the application corresponding to the manifest file. For example, the directory could be an installation directory for the application or a working directory the application will employ at runtime. Regarding permissions, the portion 602 identifies that the "/stuff" directory should have read-write permissions. This may, for example, correspond to it having read-write permissions for a user installing the application and/or all users of the mobile device. Notably, the permission format illustrated is by way of example, and other formats for expressing permissions may, additionally or alternatively, be employed. For example, a representation of traditional UNIX permissions and/or an indication of an access control list could be included. In some implementations, it could be that installation of the application corresponding to the manifest file is expected to create the identified directory and to set corresponding operating system permissions on that folder. As such, conveniently, the addition of such metadata to a manifest file may allow desired directories associated with an application being installed to be created at install time.

The portion 604 includes information related to resources as may be employed by the application corresponding to the manifest file. A first resource, which happens to be a Portable Network Graphics (PNG) format image, has an associated name of "https://example.com/image1.png". A second resource, also a PNG-format image, has an associated address of "https://example.com/image2.png".

The resource names, which, as illustrated, may be a uniform resource locator (URL) may provide and/or include an address for retrieval of the corresponding resource. In other words, metadata, such as that shown in the portion 604 may allow resources utilized by an application but not included in an application installation archive file to be described. Conveniently, such "out-of-band" application resources may be updated without requiring update of application installation archive files. Additionally or alternatively, parallel download of application resources during or prior to application installation may be enabled such as in manners as are described below with regard to FIG. 7.

Notably, although both of the example resources shown in the portion 604 are PNG-format images, images of other formats may also be provided in a similar manner. More broadly, other types of resources such as, for example, sounds, video, strings, etc. could, additionally or alternatively, be provided by way of similar entries in a manifest file.

In addition to allowing for enhancements to application installation, provision of additional manifest file metadata may allow additional validation against a device management policy to be performed.

For example, where a manifest file provides a description of one or more directories and associated permissions (e.g., as discussed about with regard to the portion 602 (FIG. 6)), it could be that determining whether installation of the application on the computing device would comply with a device management policy for the computing device includes extracting, from the manifest file or a portion thereof (as the case may be), file permissions to be associated with one or more folders associated with the application after installation. For example, such folders could, as discussed above, be folders that are expected to be created during installation of the application. The extracted file permissions may be compared to file permission rules associated with a device management policy to determine whether the device management policy would permit creation of that folder with the indicated permissions. For example, determining that installation of the application would comply with a device management policy (e.g., at the operation 430 (FIG. 4)), may include determining that the file permissions do not violate any of the file permission rules associated with the device management policy for the computing device. An example of a file permission rule may include a restriction against applications having associated folders and/or files that are globally readable and/or globally writeable. For example, that creating a folder with particular permissions would violate one or more such file permission rules, may imply that installation of the application on the computing device would be contrary to the device management policy.

In another example, where a manifest file provides addresses of resources utilized by the application that are not included in the application's installation archive file (e.g., as discussed about with regard to the portion 604 (FIG. 6)), it may be that determining whether installation of the application on the computing device would comply with a device management policy for the computing device includes extracting, from the manifest file or a portion thereof (as the case may be), an address of such a resource utilized by an application that is not included in the archive file. Then, using that address, it can be determined whether or not that resource is accessible by the computing device. For example, determining that installation of the application would comply with a device management policy (e.g., at the operation 430 (FIG. 4)), may include determining, using the address, that the resource be accessible by the computing device. By contrast, the resource being inaccessible may imply that installation of the application on the computing device would be contrary to the device management policy.

Determining whether the resource is accessible by the computing device may test device management policy insofar as the device management policy may restrict access to portions of the Internet such as, for example, based on domain, content filtering, a combination thereof, and/or the like. Accordingly, determining, using the address of a resource, that a resource is accessible by the computing device may include attempting to download the resource from an address. If no error is encountered, it may be that the download is aborted so that the resource may be downloaded later (e.g. on an "as needed" basis). Alternatively, the download may be allowed to proceed unless some other aspect of the application is found to violate the device management policy such that the application installation should not proceed. In such circumstances, the download may be aborted as retrieval of the resource may be unnecessary if installation of the application will be foregone.

More broadly, as a check before downloading the application installation archive package, it may be that a determination is made as to whether one or more resources are accessible via a proxy server that the target computer system (i.e., the target for installation of the application) is required to utilize to access the Internet or portions/aspects thereof. For example, it may be that, if the proxy server does not allow access to one or more required resources, then installation may be blocked to avoid installing the application when it will be unusable and/or may malfunction due to the unavailability of those resources at runtime due to their inaccessibility via the proxy server.

As mentioned above, a manifest file providing addresses of resources utilized by the application that are not included in the application's installation archive file may also permit parallel downloading of one or more of the resources. An example of computer systems co-operating, with one of the computing systems performing a method similar to the method illustrated in FIG. 4 will now be described with respect to FIG. 7.

Figure 7:
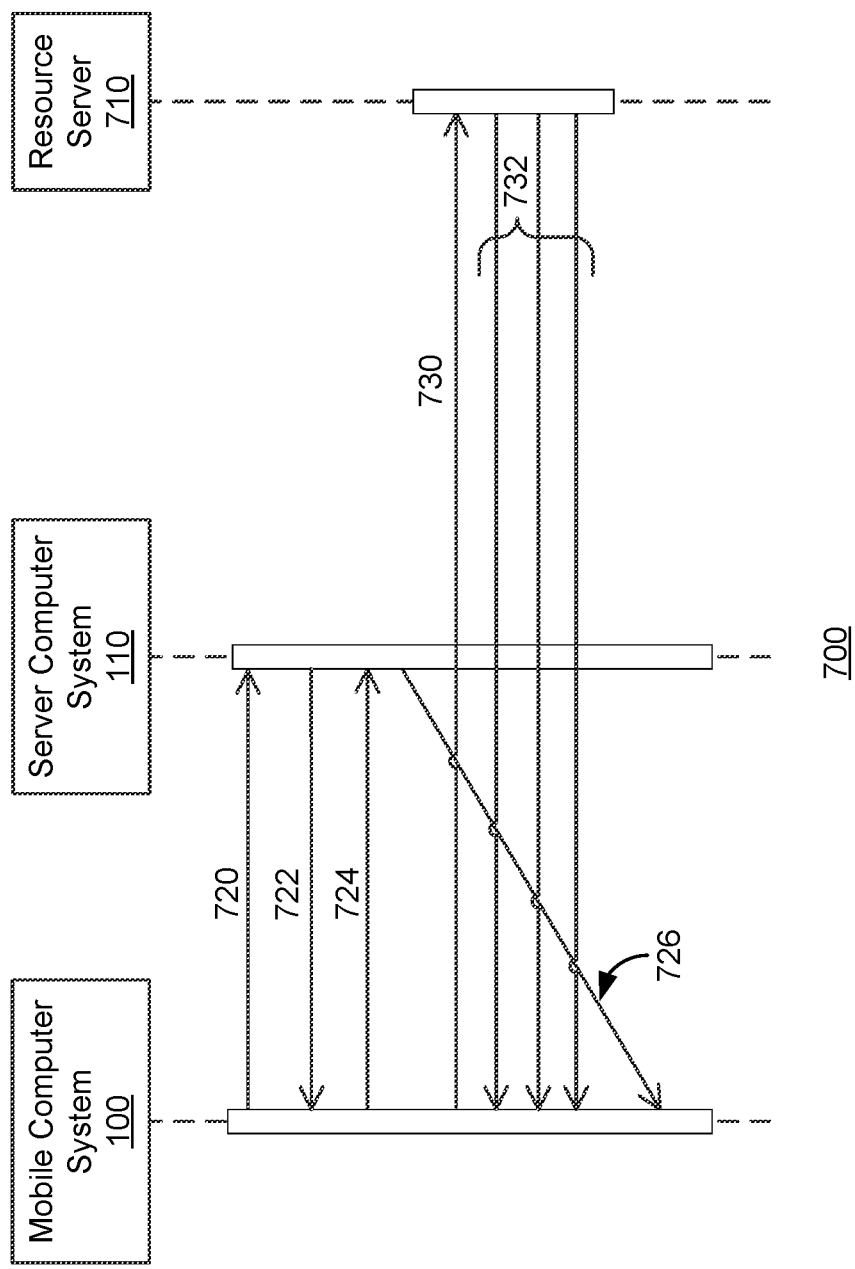
FIG. 7 provides an example exchanges of messages in selectively installing an application based on a manifest file.

FIG. 7 illustrates a sequence diagram 700 with a format similar to a Unified Modelling Language (UML) sequence diagram showing how installation of an application may proceed by way of a series of data transfers. In particular, the sequence diagram 700 depicts data transfers between the mobile computer system 100, the server computer system 110, and a resource server 710 in performing such downloads.

In the following description of the sequence diagram 700, discussion is made of various data transfers being sent and received via a computer network such as, for example, network 120. These data transfers may be implemented as messages. However, it may be that some or all of the illustrated messages may not correspond to messages per se when sent over the computer network but may instead be implemented using techniques such as for example remote procedure calls (RPC), web services application program interfaces (APIs), and/or other forms of data transfer such as, for example, file transfers according to one or more of hypertext transport protocol (HTTP), file transfer protocol (FTP), or the like.

Referring to the sequence diagram 700, first, an indication may be received to install an application on the mobile computer system 100 such as, for example, discussed with regard to the operation 410 (FIG. 4). Responsive to such an indication, the mobile computer system 100 may send a data transfer 720 to the server computer system 110. The data transfer 720 may correspond to a request for a manifest file (or a portion thereof), the manifest file being associated with the application to be installed. As further described below, the manifest file or portion thereof includes metadata indicating addresses of resources that are not included in the application installation archive file such as, for example, as was discussed above with regard to portion 604 (FIG. 6).

Responsive to the data transfer 720, the server computer system 110 may send a data transfer 722 to the mobile computer system 100, the data transfer 722 including the manifest file or at least a portion thereof.

One or both of the data transfer 720 and the data transfer 722 may correspond to the downloading of the manifest file (or a portion thereof) at the operation 420 (FIG. 4) discussed above.

Following the receipt of the manifest file, the mobile computer system 100 may perform processing based on the manifest file. For example, the mobile computer system 100 may make one or more determinations based on the manifest file (or the portion thereof) received by way of the data transfer 722. For example, the mobile computer system 100 may determine, based on the manifest file or portion thereof, whether or not to proceed with installation of the application such as, for example, based on a device management policy as discussed above with regard to the operation 430 (FIG. 4).

Following performing some or all of the processing (if any) based on the manifest file, the mobile computer system 100 may send a data transfer 724 to the server computer system 110. The data transfer 724 may include a request for the application installation archive file.

Responsive to the data transfer 724, the server computer system 110 may send a data transfer 726 to the mobile computer system 100. The data transfer 726 may correspond to downloading of the application installation archive file and may provide the archive file to the mobile computer system 100. As illustrated, the data transfer 726 may take some time such as, for example, depending on the size of the archive file.

The mobile computer system 100 may extract, from the manifest file or a portion thereof (as the case may be), one or more addresses of resources utilized by the application that are not included in the archive file. Then, data transfers to download some or all of those resources may be performed. For example, based on the addresses of resources utilized by the application that are not included in the archive file but are described in the manifest file, the mobile computer system 100 may also send data transfers to one or more remote servers, those data transfers being requests to download some or all of those resources.

An example of such a request to download a resource provided by a data transfer 730. As illustrated, the mobile computer system 100 may send the data transfer 730 to one or more resource servers 710. The one or more resource servers 710 include one or more remote servers. The data transfer 730 may be a request to download one or more resources. The data transfer 730 may include addresses of the one or more resources related to the request (i.e., the resources to be downloaded).

Responsive to such requests, the one or more remote servers may provide the requested resources to the mobile computer system 100. For example, responsive to the data transfer 730, the one or more resource servers 710 may send one or more data transfers 732 to the mobile computer system 100. The one or more data transfers 732 may correspond to downloading of the one or more resources identified in the data transfer 730. More particularly, the one or more data transfers 732 may correspond to downloading resources from one or more address such as, for example, addresses as may have been provided by way of the data transfer 730. Notably, the one or more data transfers 732 may, as illustrated, occur in parallel. For example, where two or more addresses or resources are extracted from the manifest file (or portion thereof as the case may be), those addresses may be provided to the resource server 710 and then those resources may be downloaded from the two or more addresses in parallel.

Notably, although the illustrated data transfers correspond to delivery of resources by a single server (the resource server 710), it may be that various of the resources are downloaded from different servers. Further, different resources may, in manners similar to discussed above, be requested from and/or downloaded from different servers in parallel. For example, it could be one or more resources are downloaded from a first server in parallel with the downloading of one or more resources from a second server.

Installation of the application may proceed once the retrieval of the application installation archive file (e.g., by way of the data transfer 726) completes. Additionally, in some cases, installation may await the retrieval of one or more resources identified in the manifest file that are not provided in the installation archive file.

The data transfers depicted in the sequence diagram 700 are by way of example and are capable of variation without deviating from the subject matter of the present application.

In a first example of a variation, it may be that if the manifest (or at least a portion thereof) is retrieved separately from the application archive, that the manifest is not employed for determining whether to download and install the application (e.g., based on a device management policy) but is still employed to, for example, allow retrieval of resources not provided in the application installation archive file. For example, some or all of those resources may be retrieved in parallel with the application installation archive file as discussed above and/or prior to or following the download of the application installation archive file. Notably, in some such implementations, it may be that a data transfer akin to the data transfer 724 is omitted, with the application installation archive instead retrieved by way of a data transfer akin to the data transfer 726 responsive to a data transfer akin to the (initial) data transfer 720.

In a second example of a variation, it may be that the manifest is downloaded from a different server than the application archive.

More broadly, variations to the examples discussed herein may be made without deviating from the subject matter of the present application. For example, while the mobile computer system 100 is described as being mobile, in some implementations the mobile computer system 100 may be a computer system generally considered not to be mobile/portable (e.g., due to its form/size, etc.).

Example embodiments of the present application are not limited to any particular operating system, system architecture, mobile device architecture, server architecture, or computer programming language.

Further, as mentioned above, the various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A computer-implemented method comprising:
   receiving an indication to install an application on a computing device, the application available for download as an archive file storing a manifest file including an address of a resource located on a remote system and utilized by the application;
   determining that installation of the application is permissible, the determining including:
      without downloading the archive file, downloading at least a portion of the manifest file including the address of the resource located on the remote system and utilized by the application; and
      determining, based on the at least a portion of the manifest file including the address of the resource located on the remote system and utilized by the application, that installation of the application on the computing device would comply with a device management policy for the computing device by using the address to determine that the resource is accessible by the computing device before installing the application; and
   after determining that the resource located on the remote system is accessible by the computing device and installation of the application is permissible, downloading the archive file and installing the application from the archive file.

2. The computer-implemented method of claim 1 further comprising:
   receiving an indication to install a second application on the computing device, the second application available for download as a second archive file storing a second manifest file; and
   determining that installation of the second application is not permissible, the determining including:
      without downloading the second archive file, downloading at least a portion of the second manifest file; and
      determining, based on the at least a portion of the second manifest file, that installation of the second application on the computing device would not comply with the device management policy for the computing device.

3. The method of claim 1, wherein determining, based on the at least a portion of the manifest file, that installation of the application on the computing device would comply with the device management policy for the computing device includes:
   extracting, from the at least a portion of the manifest file, one or more device permissions requested by the application; and
   comparing the one or more device permissions requested by the application to one or more device permissions associated with the device management policy for the computing device.

4. The method of claim 1, wherein determining, using the address, that the resource is accessible by the computing device includes attempting to download the resource from the address.

5. The method of claim 1, further comprising:
   extracting, from the at least a portion of the manifest file, two or more addresses of resources utilized by the application; and downloading the resources from at least two of the two or more addresses in parallel.

6. The method of claim 1, wherein determining, based on the at least a portion of the manifest file, that installation of the application on the computing device would comply with the device management policy for the computing device includes:
   extracting, from the at least a portion of the manifest file, file permissions to be associated with one or more folders associated with the application after installation; and
   determining that the file permissions do not violate one or more file permission rules associated with the device management policy for the computing device.

7. The method of claim 6, wherein the one or more file permission rules include a restriction against applications having associated files that are globally readable.

8. The method of claim 6, wherein the one or more file permission rules include a restriction against applications having associated files that are globally writeable.

9. The method of claim 1, wherein the at least a portion of the manifest file is downloaded from a different server than the archive file.

10. The method of claim 1, wherein determining, based on the at least a portion of the manifest file including the address of the resource utilized by the application, that installation of the application on the computing device would comply with the device management policy for the computing device by using the address to determine that the resource is accessible by the computing device includes aborting a download of the resource.

11. The method of claim 1, further comprising, after determining that the resource is accessible by the computing device and installation of the application is permissible, downloading the resource.

12. One or more non-transitory computer-readable storage media storing instructions that, when executed by one or more processors of a computing device, cause the computing device to:
   receive an indication to install an application on the computing device, the application available for download as an archive file storing a manifest file including an address of a resource located on a remote system and utilized by the application;
   determine that installation of the application is permissible, wherein a determination that installation of the application is permissible is based on:
      a download of at least a portion of the manifest file including the address of the resource located on the remote system and utilized by the application without a download of the archive file, and
      a determination, based on the at least a portion of the manifest file including the address of the resource located on the remote system and utilized by the application, that installation of the application on the computing device would comply with a device management policy for the computing device by using the address to determine that the resource is accessible by the computing device before installing the application; and
   after the determination that the resource located on the remote system is accessible by the computing device and installation of the application is permissible, download the archive file and install the application from the archive file.

13. The one or more non-transitory computer-readable storage media of claim 12, wherein the determination, based on the at least a portion of the manifest file, that installation of the application on the computing device would comply with the device management policy for the computing device is based on:
   extraction, from the at least a portion of the manifest file, of one or more device permissions requested by the application; and
   a comparison of the one or more device permissions requested by the application to one or more device permissions associated with the device management policy for the computing device.

14. The one or more non-transitory computer-readable storage media of claim 12, wherein the determination, using the address, that the resource is accessible by the computing device is based on an attempt to download the resource from the address.

15. The one or more non-transitory computer-readable storage media of claim 12, wherein the instructions, when executed by the one or more processors of the computing device, further cause the computing device to:
   extract, from the at least a portion of the manifest file, two or more addresses of resources utilized by the application; and
   download the resources from at least two of the two or more addresses in parallel.

16. The one or more non-transitory computer-readable storage media of claim 12, wherein the determination, based on the at least a portion of the manifest file, that installation of the application on the computing device would comply with the device management policy for the computing device is based on:
   extraction, from the at least a portion of the manifest file, of file permissions to be associated with one or more folders associated with the application after installation; and
   a determination that the file permissions do not violate one or more file permission rules associated with the device management policy for the computing device.

17. The one or more non-transitory computer-readable storage media of claim 16, wherein the one or more file permission rules include a restriction against applications having associated files that are globally readable.

18. The one or more non-transitory computer-readable storage media of claim 16, wherein the one or more file permission rules include a restriction against applications having associated files that are globally writeable.

19. The one or more non-transitory computer-readable storage media of claim 12, wherein the at least a portion of the manifest file is downloaded from a different server than the archive file.

20. A computer system comprising:
   one or more processors; and
   one or more non-transitory computer-readable media storing instructions that, when executed by one or more processors of a computing device, cause the computer system to:
      receive an indication to install an application on a computing device, the application available for download as an archive file storing a manifest file including an address of a resource located on a remote system and utilized by the application;
      determine that installation of the application is permissible, wherein a determination that installation of the application is permissible is based on:
         a download of at least a portion of the manifest file including the address of the resource located on the remote system and utilized by the application without a download of the archive file, and a determination, based on the at least a portion of the manifest file including the address of the resource located on the remote system and utilized by the application, that installation of the application on the computing device would comply with a device management policy for the computing device by using the address to determine that the resource is accessible by the computing device before installing the application; and after determining that the resource located on the remote system is accessible by the computing device and installation of the application is permissible, download the archive file and install the application from the archive file.

* * * * *